United States Patent
Sela et al.

(10) Patent No.: US 10,360,192 B1
(45) Date of Patent: Jul. 23, 2019

(54) METHOD AND APPARATUS FOR IDENTIFYING DATABASE I/O ACTIVITY

(75) Inventors: Nir Sela, Tzur Igal (IL); Adi Hirschtein, Givataim (IL); Ron Bigman, Holon (IL); Shay Zukerman, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 13/539,176

(22) Filed: Jun. 29, 2012

(51) Int. Cl.
*G06F 16/00* (2019.01)
*G06F 16/21* (2019.01)
*G06F 9/455* (2018.01)

(52) U.S. Cl.
CPC .. *G06F 16/217* (2019.01); *G06F 2009/45583* (2013.01)

(58) Field of Classification Search
CPC ................ G06F 16/217; G06F 2009/45583
See application file for complete search history.

(56) References Cited

U.S. PATENT DOCUMENTS

| | | | | |
|---|---|---|---|---|
| 6,195,653 B1* | 2/2001 | Bleizeffer | ......... | G06F 17/30306 |
| 2002/0143847 A1* | 10/2002 | Smith | ................ | G06F 9/4881 718/103 |
| 2005/0203921 A1* | 9/2005 | Newman et al. | ............. | 707/100 |
| 2011/0161299 A1* | 6/2011 | Prahlad et al. | ................ | 707/649 |
| 2012/0101984 A1* | 4/2012 | Lintum | ............. | G06F 17/30306 707/609 |
| 2012/0173477 A1* | 7/2012 | Coutts | ............... | G06F 17/30306 707/602 |

* cited by examiner

*Primary Examiner* — Paul Kim
(74) *Attorney, Agent, or Firm* — Anderson Gorecki LLP

(57) ABSTRACT

A SQL database tool maps database objects to storage addresses. The SQL database translates SQL requests to I/O requests on specific extents of OS files. A data structure maps the OS file extents to database objects. Using this mapping, I/O requests on files can be correlated to their relevant database objects, providing analysis of I/O activity and I/O wait time for database objects. Based on the computed database object activity level, the database objects may be allocated to different storage tiers according to their I/O needs.

10 Claims, 2 Drawing Sheets

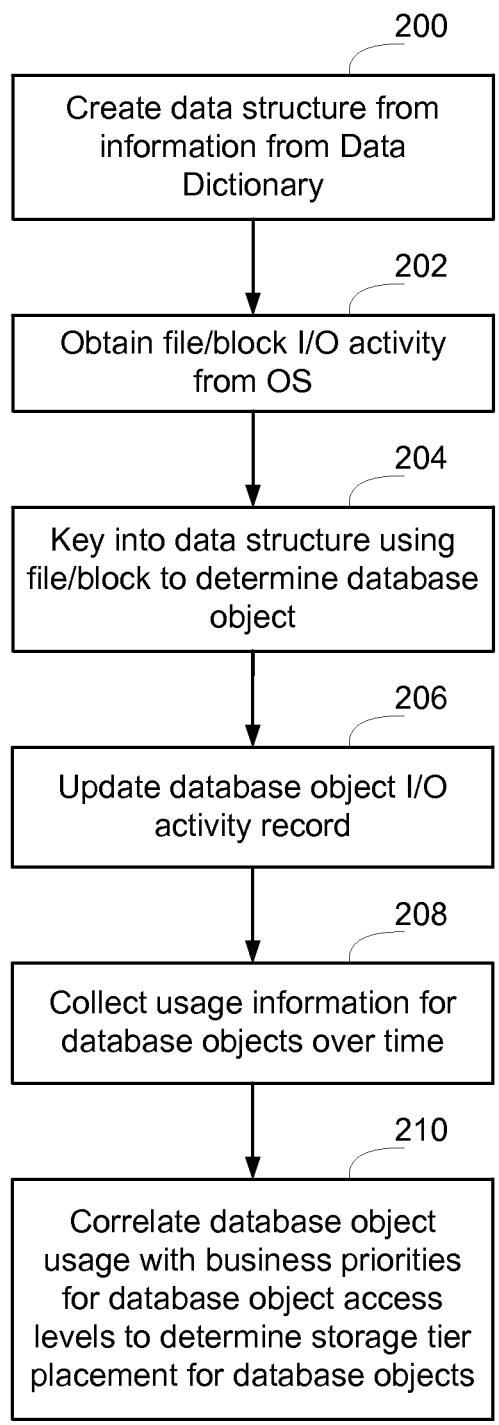

METHOD AND APPARATUS FOR IDENTIFYING DATABASE I/O ACTIVITY

CROSS REFERENCE TO RELATED APPLICATIONS

None

FIELD

The field relates to identifying database object activity.

DESCRIPTION OF THE RELATED ART

A computer includes one or more central processing units and other hardware that together execute operations to allow the computer to process data. Storage arrays have been developed to store data for one or more computer systems. Storage arrays generally include multiple physical disks drives, and a storage system allocates storage capacity offered by the disk drives to enable external computer systems to store data and obtain access to data stored in the storage array.

In general, smaller faster disk drives are more expensive, while larger slower disk drives are less expensive. To take advantage of the cost savings associated with the slower disk drives, while still providing fast access to data, a tiered storage array may be created using storage devices of multiple types. Automated systems for moving data between storage tiers have been developed which will automatically plan and non-disruptively execute changes to the storage mappings to enable more heavily accessed data to be stored in higher performing storage tiers. An example system of this nature is disclosed in U.S. patent application Ser. No. 13/431,071, filed Mar. 27, 2012, entitled Method and Apparatus for Enabling Access to Tiered Shared Storage Using Dynamic Tier Partitioning, the content of which is hereby incorporated herein by reference.

Tiered storage systems operate at the physical level to optimize storage of data by allocating more frequently used data to higher performing storage tiers. There are instances, however, where it may be preferable from a business standpoint to organize storage of data based on logical data object basis, to enable performance of the database system to more closely align with business objectives. For example, a database operator may prefer to specify access times to the data objects to enable the database performance to meet particular performance expectations.

Unfortunately, some database servers are not able to provide information about how long an application is required to wait for particular database objects to be accessed. This complicates making tier placement recommendations to the tiered storage system to enable the database to achieve a specified set of business objectives. Moreover, the tiered storage system does not have visibility as to the type of data being stored in the system, and rather is configured to allocate physical storage space based on the usage patterns of the physical extents. Thus, aligning database objects with physical storage in the tiered storage system also is not straightforward using the underlying tiered storage system directly, since the tiered storage system operates to allocate physical extents based on usage patterns without regard to the content of the data. Accordingly, it would be advantageous to provide a method and apparatus for identifying database object activity to enable database objects to be allocated to storage tiers in a tiered storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A SQL database tool maps database objects to storage addresses. The SQL database translates SQL requests to I/O requests on specific extents of OS files. A data structure maps the OS file extents to database objects. Using this mapping, I/O requests on files can be correlated to their relevant database objects, providing analysis of I/O activity and I/O wait time for database objects. Based on the computed database object activity level, the database objects may be allocated to different storage tiers according to their I/O needs.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 2 is a flow chart of an example processes of identifying database object access activity according to an embodiment.

DETAILED DESCRIPTION

Figure 1:
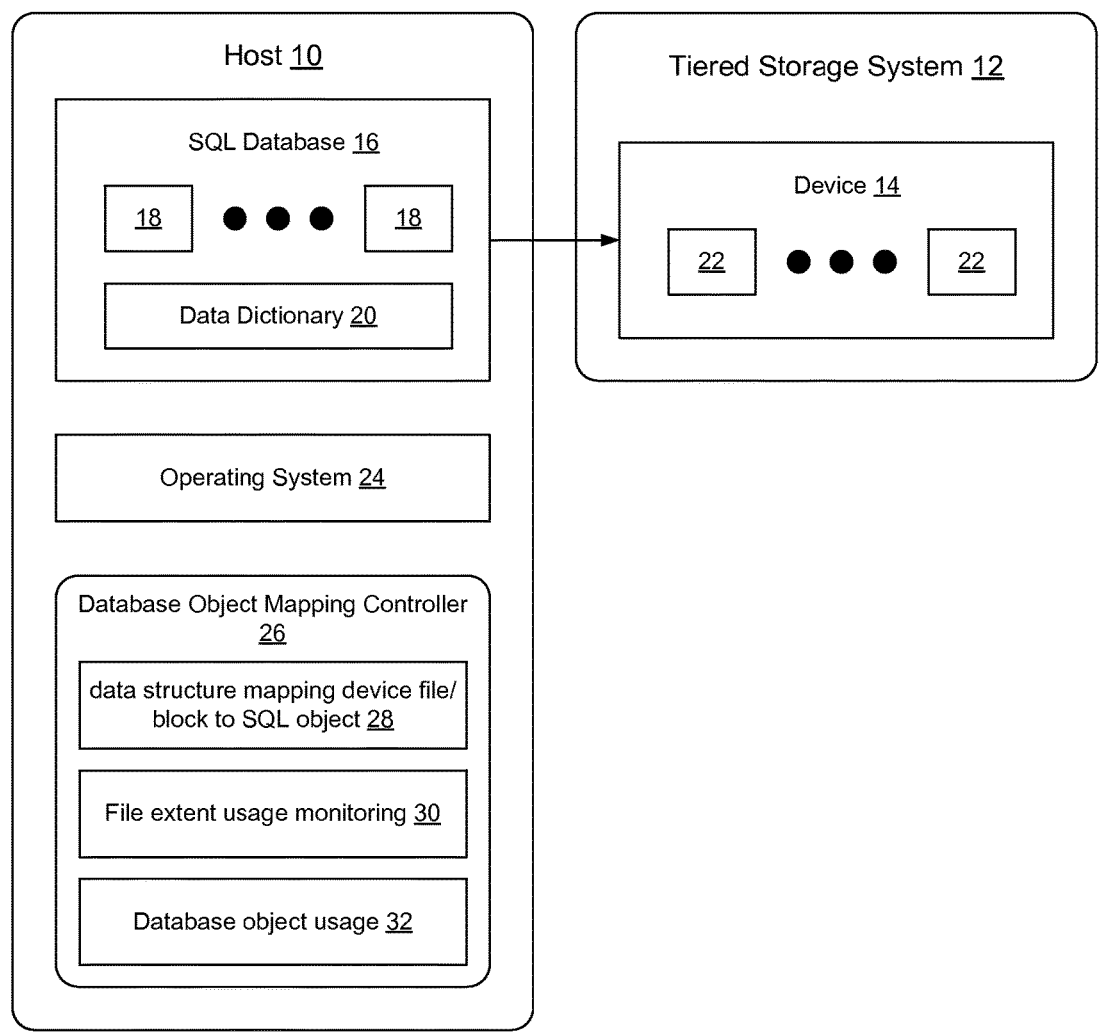
FIG. 1 is a functional block diagram of an example system according to an embodiment.

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

FIG. 1 shows an embodiment of a system that is designed to enable the activity levels of database objects to be determined. As shown in FIG. 1, a host 10 configured to operate as a Structured Query Language (SQL) server is allocated storage by tiered storage system 12. Storage space offered by the tiered storage system 12 appears to host 10 as device 14. Operating system 24 on host 10 performs read operations and write operations to device 14 as it would to any conventional storage volume such as a disk drive or storage array.

A SQL database 16 on host 10 includes database objects 18. The database objects are stored in storage device 14. As data is written to the device, the information about the location of the objects 18 on the device is written to a data dictionary 20. The information in the data dictionary thus includes information about the physical location where the objects are stored in the device 14 and maps database objects 18 of the SQL database 16 to regions 22 offered by device 14. Information within the data dictionary 20 is used by the database to fetch data requested via SQL by sending I/O requests to host 10 specifying to the Operating System (OS)

24 the exact file and block needed to be read from the device. This information is available using the SQL "dbcc extent info" command and is part of the normal set of tools available on a SQL server implementing a SQL database.

According to an embodiment, a Database Object Mapping Controller 26 is provided to correlate file/block extent usage with database objects, to enable activity levels of logical storage volumes such as database objects to be determined and used to control placement of information within the tiered storage system. In one embodiment, the database object mapping controller 26 obtains information about where database objects 18 are stored on device 14 by using "dbcc extent info", and creates a data structure correlating database objects 18 with blocks 22. This mapping is performed periodically, for example once per day.

According to an embodiment, the physical location (file/block) of all objects in the database is read from the data dictionary 20. This information is passed to the database object mapping controller 26. The database object mapping controller 26 creates a data structure such as a table mapping the device file/block and SQL objects. For example a table containing a list of file/block identifiers and database object associations may be created. Many data structures may be implemented to enable the device file/block identifiers of device 14 to be correlated with database objects 18.

During actual I/O activity, each I/O request to the operating system 24 is analyzed and translated from the file/block to the database objects, keeping all of the session information. The I/O activity may be obtained by the database object mapping controller using an OS hook or other OS activity monitoring system. File extent usage monitoring component 30 obtains the I/O request information from the operating system 24 and uses the data structure 28 to correlate I/O requests with database object requests. Further, the file extent usage monitoring component 30 may also receive I/O fulfillment information from the operating system 24 when the device 14 fulfills the request to enable the responsiveness of the device 14 to be determined as well. This allows the wait time for database objects to be computed along with the database object activity level.

Since high I/O activity may require identifying a large number of objects per second, the data structure that is used to enable database objects to be identified is designed to enable a binary search to be implemented by file and extent (which are provided by the database). This enables the system to support large numbers of object seeks per second, and hence identify and store statistical I/O information at the database object level.

Information about database object usage is stored in object usage data structure 32, which may be separate from data structure 28 or interrelated with data structure 28. The object usage data structure enables information about session and database objects to be stored for further analysis. Using this information, it is possible to provide recommendations on placing of the database objects on the appropriate storage tier to maximize performance according to business priority rather than allocating storage based only on physical activity level.

FIG. 2 shows a flow chart of an example process according to an embodiment. As shown in FIG. 2, a data structure is created, or updated, periodically based on information available in the data dictionary 20. The data structure includes a list of file/block numbers where database objects are stored within the device and an identifier of the database objects stored at each file/block (200).

As database objects are accessed, the file/block I/O activity information is obtained from the Operating System (202). The identity of the file/block experiencing activity is used to key into the data structure to identify database objects stored at the active extents (204). Since the physical activity is able to be identified and correlated back to logical database objects, the data structure provides activity level information of the database objects. As physical activity occurs, a database object I/O activity record is updated (206). Over time, this activity level of the database objects may be collected and then used to cause the more active objects to be identified (208). Likewise, the wait time for completion of database object access operations may be computed to identify objects experiencing high wait times between request and fulfillment. Based on the activity levels of the database objects, wait time, and business priorities to be achieved in connection with operation of the database, recommendations for placement of objects in storage tiers of a tiered storage system may be provided (210).

The methods described herein may be implemented as software configured to be executed in control logic such as contained in a CPU of an electronic device such as a computer. In particular, the functions described herein may be implemented as sets of program instructions implemented utilizing programming techniques known to those of ordinary skill in the art that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random access memory, a computer memory, a disk, or other storage medium. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining storage tier placement of SQL database objects in a tiered storage system, the method comprising the steps of:

updating a data structure with information from a SQL database relative to mapping of the SQL database objects to associated blocks of physical memory of a storage volume maintained by an Operating System (OS), the storage volume being implemented using the tiered storage system;

receiving data access requests for access to data stored in the SQL database;

fulfilling the data access requests, by the OS, by issuing memory access input/output (I/O) operations on blocks of the physical memory associated with the data access requests;

determining which blocks of physical memory are being accessed by the OS in connection with fulfilling the data access requests by monitoring, by an OS monitoring system, the memory access I/O operations performed by the OS on the blocks of the physical memory to create I/O activity information;

obtaining, by a database object mapping controller, the I/O activity information from the OS monitoring system;

determining, by the database object mapping controller using the I/O activity information, how frequently the OS is accessing particular blocks of the physical memory;

using the data structure, by the database object mapping controller, to correlate the I/O activity information with the SQL database objects, to obtain activity levels and wait times of the SQL database objects; and using the SQL database object activity levels and wait times to control storage tier placement for the SQL database objects in the tiered storage system.

2. The method of claim 1, wherein the OS monitoring system is an OS hook.

3. The method of claim 1, wherein the information relative to mapping of SQL database objects is obtained by the database object mapping controller from the SQL database using SQL dbcc extent info command.

4. The method of claim 1, wherein the data structure is a table correlating the SQL database objects to the associated blocks of physical memory of the storage volume maintained by the OS.

5. The method of claim 3, further comprising the step of collecting, by the database object mapping controller, the OS activity information about I/O requests for the associated blocks of physical memory over time.

6. A non-transitory tangible computer readable storage medium having stored thereon a computer program for determining storage tier placement of SQL database objects in a tiered storage system, the computer program comprising a set of instructions which, when executed by a computer, cause the computer to perform a method comprising the steps of:

updating a data structure with information from a SQL database relative to mapping of the SQL database objects to associated blocks of physical memory of a storage volume maintained by an Operating System (OS), the storage volume being implemented using the tiered storage system;

receiving data access requests for access to data stored in the SQL database;

fulfilling the data access requests, by the OS, by issuing memory access input/output (I/O) operations on blocks of the physical memory associated with the data access requests;

determining which blocks of physical memory are being accessed by the OS in connection with fulfilling the data access requests by monitoring, by an OS monitoring system, the memory access I/O operations performed by the OS on the blocks of the physical memory to create I/O activity information;

obtaining the I/O activity information by a database object mapping controller;

determining, by the database object mapping controller using the I/O activity information, how frequently the OS is accessing particular blocks of the physical memory;

using the data structure, by the database object mapping controller, to correlate the I/O activity information with the SQL database objects, to obtain activity levels and wait times of the SQL database objects without having access to the original SQL data access requests; and using the SQL database object activity levels and wait times to control storage tier placement for the SQL database objects in the tiered storage system.

7. The non-transitory tangible computer readable storage medium of claim 6, wherein the OS monitoring system is an OS hook.

8. The non-transitory tangible computer readable storage medium of claim 6, wherein the information relative to mapping of SQL database objects is obtained by the database object mapping controller from the SQL database using SQL dbcc extent info command.

9. The non-transitory tangible computer readable storage medium of claim 6, wherein the data structure is a table correlating the SQL database objects to the associated blocks of physical memory of the storage volume maintained by the OS.

10. The non-transitory tangible computer readable storage medium of claim 8, further comprising the step of collecting, by the database object mapping controller, the OS activity information about I/O requests for the associated blocks of the physical memory over time.

* * * * *